United States Patent
Karabiyik et al.

(10) Patent No.: US 12,545,809 B2
(45) Date of Patent: Feb. 10, 2026

(54) MOISTURE-CURING CONFORMAL COATING COMPOSITIONS

(71) Applicant: Wacker Chemie AG, Munich (DE)

(72) Inventors: Ufuk Karabiyik, Ann Arbor, MI (US); Hyungdae Jin, San Ramon, CA (US); Rabih Makki, Silverspring, MD (US); Nicholas White, Whitmore Lake, MI (US); John Young, Saline, MI (US)

( * ) Notice: Subject to any disclaimer, the term of this patent is extended or adjusted under 35 U.S.C. 154(b) by 593 days.

(21) Appl. No.: 18/008,181

(22) PCT Filed: Jun. 24, 2020

(86) PCT No.: PCT/EP2020/067628
§ 371 (c)(1),
(2) Date: Dec. 5, 2022

(87) PCT Pub. No.: WO2021/259460
PCT Pub. Date: Dec. 30, 2021

(65) Prior Publication Data
US 2023/0279263 A1  Sep. 7, 2023

(51) Int. Cl.
*C09D 183/04* (2006.01)
*C08G 77/16* (2006.01)
*C08G 77/26* (2006.01)
*C08K 5/00* (2006.01)
*C08K 5/5419* (2006.01)
*C08K 5/544* (2006.01)
*C09D 5/16* (2006.01)
*C09D 7/41* (2018.01)
*C09D 7/63* (2018.01)

(52) U.S. Cl.
CPC ............ *C09D 183/04* (2013.01); *C08G 77/16* (2013.01); *C08G 77/26* (2013.01); *C08K 5/0041* (2013.01); *C08K 5/5419* (2013.01); *C08K 5/544* (2013.01); *C09D 5/1675* (2013.01); *C09D 7/41* (2018.01); *C09D 7/63* (2018.01)

(58) Field of Classification Search
CPC ......... C08K 5/544; C08L 83/04; C08L 83/06; C09D 183/04; C09D 183/06
USPC ....................................................... 524/588
See application file for complete search history.

(56) References Cited

U.S. PATENT DOCUMENTS

| | | |
|---|---|---|
| 3,531,424 A | 9/1970 | Swanson |
| 4,424,252 A | 1/1984 | Nativi |
| 4,644,074 A | 2/1987 | Manis et al. |
| 5,179,134 A | 1/1993 | Chu et al. |
| 5,300,608 A | 4/1994 | Chu et al. |
| 6,365,670 B1 | 4/2002 | Fry |
| 6,828,355 B1 | 12/2004 | Chu |
| 7,074,875 B2 | 7/2006 | Schindler et al. |
| 8,507,618 B2 | 8/2013 | Schäfer et al. |
| 2009/0082498 A1 | 3/2009 | Kimura |
| 2009/0123703 A1 | 5/2009 | Mohamed |
| 2015/0175863 A1 | 6/2015 | Baily et al. |
| 2015/0218377 A1* | 8/2015 | Schoeley ............. C08K 5/5477 524/588 |
| 2020/0002535 A1 | 1/2020 | Lim |

FOREIGN PATENT DOCUMENTS

| | | | |
|---|---|---|---|
| CN | 113980639 A | * | 1/2022 |
| EP | 0510608 A1 | | 10/1992 |
| EP | 0559045 B1 | | 4/1996 |
| EP | 3660117 A1 | | 6/2020 |
| JP | H07252420 A | | 10/1995 |
| JP | 2009073957 A | * | 4/2009 |
| WO | 2003014226 A1 | | 2/2003 |
| WO | 2003018658 A1 | | 3/2003 |
| WO | 2016106390 A2 | | 6/2016 |

OTHER PUBLICATIONS

Product data for Elastosil ColorPaste FL UV (no date).*
Chapter 7.6 "Silicone Rubber Adhesive" and Chapter 7.7 "Styrenic Thermoplastic Rubber Adhesive" from Adhesion theory, technology and application, Guangzhou: South China University of Technology Press , 2014, Li Hongqiang Chief Editor.

* cited by examiner

Primary Examiner — Marc S Zimmer

(57) ABSTRACT

Moisture-curing coating compositions, processes for making the same and uses for the same. The composition includes a Component (A) of one or more linear hydroxyl terminated organopolysiloxanes, a Component (B) of one or more organopolysiloxane resins, a Component (C) of one or more organosilicates, a Component (C) of one or more organosilicates, a Component (D) of one or more alkoxysilanes having at least one tertiary amino group, a Component (E) of one or more alkoxysilanes having at least one primary or secondary amino group and a Component (F) of one or more UV-fluorescent pigments. Where the one or more alkoxysilanes having at least one tertiary amino groups (D) have the following general formula (IV) $R^3R^4N-(CR^5_2)-Si(R^2)_{3-x}(OR^1)_x$.

12 Claims, No Drawings

MOISTURE-CURING CONFORMAL COATING COMPOSITIONS

CROSS-REFERENCE TO RELATED APPLICATIONS

This application is a U.S. National Phase application of PCT Application NO. PCT/EP2020/067628 filed on Jun. 24, 2020, which is incorporated by reference herein in its entirety.

TECHNICAL FIELD

The present invention relates to a moisture-curing conformal coating composition having improved mechanical and adhesion properties as well as thermal stability. The conformal coating composition comprises (A) one or more linear hydroxyl terminated organopolysiloxanes, (B) one or more organopolysiloxane resins, (C) one or more organosilicates, (D) one or more alkoxysilanes having at least one tertiary amino group, (E) one or more alkoxysilanes having at least one primary or secondary amino group, and (F) one or more UV-fluorescent pigments. The present invention further relates to a method of preparing such moisture-curing conformal coating composition.

BACKGROUND ART

Conformal coatings are thin polymeric films which conform to the contours of a printed circuit board to protect the board's components. In particular, conformal coatings are used to protect electronic components from the environmental factors they are exposed to. Examples of these factors include moisture, dust, salt, chemicals, temperature changes and mechanical abrasion. There are many chemistries of conformal coatings available including acrylic, epoxy, polyurethane, silicones, fluorinated or non-fluorinated poly-para-xylylene and amorphous fluoropolymer. It is important to choose a coating chemistry meeting the application needs.

The conformal coating of the present invention is preferably solventless, one-component and due to unique crosslinking chemistry, stable and fast cure under ambient temperature. It is preferably also free of metal catalyst. In addition, due to the reactive silane that is utilized as component (D) the cure is very fast (<15 min tack free time) without adversely impacting the shelf life. Current conformal coatings have one or more undesirable features such as high solvent or volatile organic content, need for mixing, long cure times, or anchorage and adhesion problems onto the circuit boards. Many earlier prior art publications, such as, for example, U.S. Pat. Nos. 4,424,252A, 5,179,134A, 5,300,608A, and 6,828,355B1 are focusing on either UV curable or dual UV/moisture curable conformal coatings for fast cure processing times (UV curing usually being the method of choice for fast cure), however, here it is described a conformal coating application that cures in minutes with moisture. There are limited publications around new conformal coating systems, such as, for example, EP0510608A1, JP7252420A2, US2009123703A1, US2015175863A1, and US2020002535A1. However, these compositions are either not catalyst free or not one-part systems which mostly require pre-mixing. The conformal coating composition of the present invention is preferably a one-part composition. Preferably, the conformal coating composition is free of catalyst (catalyst free due to the presence of silane crosslinker (D)).

Accordingly, it has been an object of the present invention to provide a conformal coating composition that is sprayable and preferably solvent-free and free of metal catalyst. The conformal coating composition should adhere well on to printed circuit boards and be suitable for automated optical inspection. Furthermore, the conformal coating made from such composition should preferably have a low tack-free time, elastomeric to elastoplastic properties and good thermal stability as well as good electrical insulation capability, and good anchorage and adhesion properties in the presence of flux residues.

DETAILED DESCRIPTION OF THE INVENTION

The term "conformal coating" means a polymeric film which conforms to the contours of a printed circuit board to protect the board's components from environmental factors, for example moisture, dust, chemicals, mechanical abrasion, and temperature changes.

The present invention relates to a moisture-curing conformal coating composition comprising:
(A) one or more linear hydroxyl terminated organopolysiloxanes;
(B) one or more organopolysiloxane resins;
(C) one or more organosilicates;
(D) one or more alkoxysilanes having at least one tertiary amino group;
(E) one or more alkoxysilanes having at least one primary or secondary amino group; and
(F) one or more UV-fluorescent pigments.

Optionally, the moisture-curing conformal coating composition further comprises (G) one or more additives.

Component (A):

Component (A) is a typical base film forming crosslinkable base polymer that is OH functional for moisture curing with alkoxyorgano silanes. Suitable compounds are known in the art, such as, for example, described in U.S. Pat. No. 7,074,875B2. It is commonly used for formulating RTV-1 compositions and generally made of a polymer having OH end groups.

Single-component silicone rubber mixtures (RTV-1) which can be stored if water is excluded but vulcanized in the presence of humidity at room temperature to give elastomers and sealants are widely known. They generally comprise a polymeric or oligomeric, mostly linear siloxane, a crosslinking agent which has to contain readily hydrolyzable groups, a plasticizer, which is mostly a methyl-terminated polydimethylsiloxane fluid (such as, for example WACKER® AK 50 available from Wacker Chemie AG), and, where appropriate, other additives, such as curing catalysts, pigments, processing aids, and fillers. The vulcanization of the mixtures may take place under acidic conditions, e.g. in the presence of acetoxysilanes, under basic conditions, e.g. by means of aminosilanes, or under neutral conditions, e.g. by way of compounds which have oximo groups or have alkoxy groups. RTV-1 systems which crosslink under neutral conditions are needed especially when the cleavage products arising during the curing of the mixture cannot be permitted to affect the substrates, for example conformal coating applications acetic acid may corrode printed circuit boards. In many applications, preference is given to systems which crosslink under neutral conditions because the odor of the elimination products is unpleasant in the acetoxy compositions and amine compositions. In addition, the oxime compositions are increasingly being replaced by the corresponding alkoxy compositions, because of the toxicology of the cleavage products.

For formulating RTV-1 compositions, use is generally made of a polymer having OH end groups (component (A)). The reaction of the crosslinking agent components with the OH polymer, the substances used for this purpose in the case of the alkoxy compositions being preferably trialkoxyorganosilanes, can take place during the compounding process with or without the plasticizer and the other fillers. Since these compositions are mostly difficult to produce and are subject to restrictions with regard to mixing specifications (transparent compositions being mostly impossible to obtain), use is generally made of polymers which have been end-capped in advance by alkoxy end groups. Alkoxy end capping of OH groups can be achieved during mixing step. Therefore pre-mixing component (A) and (D) and/or (E) is not necessary. However, for these above reasons components (A) and (D) are preferably first charged to the vessel and this reaction is very fast and end-capping happens in the vessel right before adding other components. Their preparation has been disclosed, by way of example, in EP0559 045B1, and generally takes place via reaction of a hydroxy-terminated polydiorganosiloxane of a particular viscosity with alkoxysilanes in the presence or absence of metal catalysts. The desired polymer (i.e. the alkoxy terminated polymer, basically the reaction product of component (A) and component (D) and/or (E)) is formed during this condensation process with an elimination of alcohol. Then this preparation of the alkoxy-terminated polymer is followed by addition of the other mixture components. However, a disadvantage with all of the processes described hitherto is that an adequate degree of conversion of the OH-end-group polymers is achieved only when using methoxysilanes. If the ethoxysilanes known hitherto are used to prepare the polymers, the conversion of the OH groups could be incomplete. Because of this, curing (gelation) of the compositions can occur before preparation of the RTV-1 mixtures completed, or even during the storage of the finished mixtures, and this means that the resultant products have inadequate storage stability. To eliminate this formulation should be optimized with excess alkoxy silane crosslinker component (D). Even if component (D) is an ethoxysilane no gelation was observed due to excess ratio and component (D) being very reactive.

Exemplary compounds are commercially available, for example, described in U.S. Pat. No. 8,507,618B2 and U.S. Pat. No. 7,074,875B2. Such compounds are available from WACKER Chemie AG under the name WACKER® CT601 which is an OH-terminated polydimethylsiloxane having a viscosity of 300 mPa·s, (measured based on a standard test method ASTM D4652 conducted at room temperature (25° C.) utilizing a Brookfield DV-1 digital viscometer instrument equipped with an LV-2(62) type spindle at a speed of 50 rpm.

Preferably, the linear hydroxyl terminated organopolysiloxane (A) has the following general formula (I):

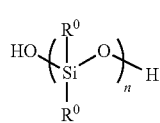
(I)

Wherein each $R^0$ is independently selected from C1 to C10 alkyl, preferably methyl, and n is a number from 5 to 5,000, preferably from 10 to 3,000. The number average molecular weight ($M_n$) is preferably in the range of 50 to 300,000, more preferably 100 to 200,000, even more preferably 5,000 to 50,000, in particular 5,000 to 20,000, measured at 25° C. in solvent THF by size exclusion chromatography (SEC). A suitable measurement system is ThermoFisher Scientific Ultimate U3000 HPLC system, equipped with a RefractoMax 521 Refractive Index Detector, using a mixed bed and a 1000A Agilent 5 um 300×7.5 mm columns connected in series.

The conformal coating composition preferably comprises 40 to 70 weight percent, more preferably 50 to 60 weight percent of component (A), based on the total weight of the moisture-curing conformal coating composition.

Component (A) is preferably different from the other components of the conformal coating composition.

Component (B):

The function of component (B) is to provide hardness and mechanical strength. An added benefit is that it is easy to react via its residual OH and/or alkoxy functionality to the other components of the composition. Hence, component B is very appropriate for moisture curable systems.

Exemplary compounds are commercially available from WACKER Chemie AG, for example, under the name WACKER® MQ803 resin which contains >3% alkoxy and ~0.3% hydroxyl groups. Such resins have proven to be quite useful in these applications.

Preferably, the organopolysiloxane resin (B) comprises the following units:

(IIa)

(IIb)

wherein each R is independently selected from an alkyl group, preferably a C1-C10 alkyl group, more preferably a methyl group, an alkoxy group, preferably a C1 to C10 alkoxy group, more preferably an ethoxy group, a hydroxy group, or an alkenyl group, preferably, a C2-C10 alkenyl group, more preferably a vinyl group. In a particularly preferred embodiment, each R is independently selected from methyl, methoxy, ethoxy, and hydroxy groups.

A preferred component of the reaction mixture used to prepare the coating composition is a functional MQ resin, preferably an OH functional MQ resin, i.e. a highly cross-linked resin containing M, D, Q, and/or T moieties. In other words, an MQ resin contains predominantly M units wherein silicon is attached to only one oxygen in the cross-linked molecules ($R_3SiO_{1/2}$), and Q units wherein each silicon atom is attached to four other oxygen atoms ($SiO_{4/2}$), resulting in a high level of cross-linking matrix. In some MQ resins, small amounts of difunctional D units ($R_2SiO_{2/2}$) and trifunctional T units ($RSiO_{3/2}$), wherein R is respectively as defined above, are also present. MQ resins are frequently produced by the hydrolysis and condensation of silanes such as tetraethoxysilane, vinyldimethylethoxysilane and trimethylethoxysilane. The resulting MQ resin frequently retains some residual alkoxy functionality as a result of the method of its preparation and may include other functionalities such as silanol functionality as well. Preferably, the organopolysiloxane resin (B) comprises at least 80%, more preferably at least 90%, even more preferred at least 95%, particularly at least 99% of M and Q units, based on the total number of M, Q, D and T units. Preferably, the ratio of numbers of M units to Q units is in the range of 30:70 to 70:30, preferably 35:65 to 65:35, based on the total number of M units and Q units.

Exemplary compounds are described, for example, in U.S. Pat. No. 6,365,670B1.

The conformal coating composition preferably comprises 10 to 30 weight percent, more preferably 15 to 25 weight percent of component (B), based on the total weight of the moisture-curing conformal coating composition.

Component (B) is preferably different from the other components of the conformal coating composition.

Component (C):

The function of component (C) is to improve mechanical properties and to increase crosslinking density.

Preferably, the organosilicate (C) has the following general formula (III):

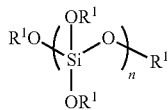
(III)

wherein each $R^1$ is independently selected from C1 to C10 alkyl, preferably C2 to C5 alkyl, more preferably ethyl, or a C2-C20 alkoxy-alkyl, and n is a number from 1 to 10, preferably 5 to 7.

Preferably, each $R^1$ is independently selected from C1 to C10 alkyl, preferably C2 to C5 alkyl, more preferably ethyl.

The organosilicate (C) may be partially hydrolyzed.

A preferred organosilicate of the general formula (III) is partially hydrolized tetra ethyl silicate.

Exemplary compounds are described in U.S. Pat. No. 3,531,424A. In particular, component (C) is preferably a polyalkoxy compound, e.g. ethyl orthosilicate or a partially hydrolyzed ethyl silicate as "Ethyl Silicate 40," which is approximately decaethyl tetrasilicate.

An exemplary compound is commercially available from WACKER Chemie AG under the name WACKER® SILICATE TES 40 WN which is an ethyl silicate polymer. It is a low-viscous liquid providing approximately 41% of silicon dioxide (silica) upon complete hydrolysis.

The conformal coating composition preferably comprises 3 to 20 weight percent, more preferably 5 to 15 weight percent of component (C), based on the total weight of the moisture-curing conformal coating composition.

Component (C) is preferably different from the other components of the conformal coating composition.

Component (D):

The function of component (D) is to rapidly build a very strong network.

There are multiple commercially available products, for example, from WACKER Chemie AG.

Exemplary compounds are described in WO 03/018658 A1 and WO 03/014226 A1. In particular, functionalized alkoxysilanes are described in which the alkoxysilyl group is separated by a methylene spacer from a heteroatom, e.g. oxygen or nitrogen, and the reactivity of the silanes with respect to hydrolysis and condensation of the silyl unit is considerably increased by the spatial proximity of these two groups are used for functionalizing organopolysiloxanes and organic polymers. The increased reactivity of such "alpha-silanes" having a methylene spacer is also described in Monatshefte für Chemie 2003, 134, 1081-1092.

Such highly reactive alpha-silanes have hitherto been used for preparing silane-functional (pre)polymers which have a correspondingly increased reactivity toward moisture and are thus suitable for producing compositions which cure in the presence of atmospheric moisture.

Preferably, the alkoxysilane having one or more tertiary amino groups (D) has the following general formula (IV):

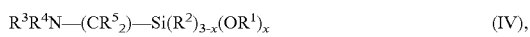
(IV), wherein
x is 2 or 3, preferably 3.

Each $R^1$ and $R^2$ are independently selected from hydrocarbon radicals having 1 to 12 carbon atoms or alkoxy-alkyl radicals having in total 2 to 20 carbon atoms. Preferably, $R^1$ and $R^2$ are independently selected from hydrocarbon radicals having 1 to 5 carbon atoms.

Examples of $R^1$ and $R^2$ are alkyl radicals, such as the methyl, ethyl, n-propyl, isopropyl, n-butyl, isobutyl, tert-butyl, n-pentyl, isopentyl, neopentyl, tert-pentyl radical, hexyl radicals, such as the n-hexyl radical, heptyl radicals, such as the n-heptyl radical, octyl radicals, such as the n-octyl radical and isooctyl radicals, such as the 2,2,4-trimethylpentyl radical, nonyl radicals, such as the n-nonyl radical, decyl radicals, such as the n-decyl radical, dodecyl radicals, such as the n-dodecyl radical; alkenyl radicals, such as the vinyl and the allyl radical; cycloalkyl radicals, such as cyclopentyl, cyclohexyl, cycloheptyl radicals and methyl-cyclohexyl radicals; aryl radicals, such as the phenyl and the naphthyl radical; alkaryl radicals, such as o-, m-, p-tolyl radicals, xylyl radicals and ethylphenyl radicals; aralkyl radicals, such as the benzyl radical, the alpha- and the beta-phenylethyl radical.

The radical $R^1$ is preferably a hydrocarbon radical having 1 to 5 carbon atoms, more particularly alkyl radicals having 1 to 3 carbon atoms. $R^1$ is more preferably methyl or ethyl radicals. $R^1$ is more preferably an ethyl group.

$R^2$ is preferably a methyl or ethyl group.

Each $R^3$ and $R^4$ are independently selected from an alkyl, cycloalkyl, alkenyl or aryl radical, each having up to 12 carbon atoms, it being possible for said radical optionally to be substituted by halogen atoms and/or organic functions, or is a divalent alkyl, cycloalkyl, alkenyl or aryl radical having up to 12 carbon atoms, it being possible for said radical optionally to be substituted by halogen atoms and/or other functional groups, such as, for example, nitro, mercapto, carboxy, carbonyl, ester, hydroxy, and ether groups.

Examples of $R^3$ and $R^4$ alkyl radicals are, such as the methyl, ethyl, n-propyl, isopropyl, n-butyl, isobutyl, tert-butyl, n-pentyl, isopentyl, neopentyl, tert-pentyl radical, hexyl radicals, such as the n-hexyl radical, heptyl radicals, such as the n-heptyl radical, octyl radicals, such as the n-octyl radical and isooctyl radicals, such as the 2,2,4-trimethylpentyl radical, nonyl radicals, such as the n-nonyl radical, decyl radicals, such as the n-decyl radical, dodecyl radicals, such as the n-dodecyl radical; alkenyl radicals, such as the vinyl and the allyl radical; cycloalkyl radicals, such as cyclopentyl, cyclohexyl, cycloheptyl radicals and methyl-cyclohexyl radicals; aryl radicals, such as the phenyl and the naphthyl radical; alkaryl radicals, such as o-, m-, p-tolyl radicals, xylyl radicals and ethylphenyl radicals; aralkyl radicals, such as the benzyl radical, the alpha- and the beta-phenylethyl radical.

The radicals $R^3$ and $R^4$ are preferably hydrocarbon radicals having 1 to 6 carbon atoms, more particularly alkyl radicals having 1 to 4 carbon atoms. $R^3$ and $R^4$ are preferably methyl, ethyl, propyl or butyl radicals.

Component (D) preferably possesses no primary amino functionality.

In formula (IV) $R^5$ is hydrogen or an alkyl, cycloalkyl, alkenyl or aryl radical having up to 12 carbon atoms, it being possible for said radical optionally to be substituted by halogen atoms and/or other functional groups, such as, for example, nitro, mercapto, carboxy, carbonyl, ester, hydroxy, and ether groups. $R^5$ is preferably a hydrogen.

In an alternative embodiment, the methyl linkage between N and $Si(R^2)_{3-x}(OR^1)_x$ can be a propyl group (so called gamma-silane), or an ethyl group.

Preferred alkoxysilanes of the general formula IV are
N,N-diethylaminomethyl-triethoxysilane,
N,N-diethylaminomethyl-methyldiethoxysilane,
N,N-dibutylaminomethyl-triethoxysilane,
N,N-dibutylaminomethyl-methyldiethoxysilane,
N-(triethoxysilylmethyl)piperazine,
N-(methyldiethoxysilylmethyl)piperazine,
N-(triethoxysilylmethyl)morpholine,
N-(methyldiethoxysilylmethyl)morpholine.
N-(3-acryloxy-2-hydroxypropyl)-3-aminopropyltriethoxysilane,
N—(N-acetylleucyl)-3-aminopropyltriethoxysilane,
3-(N-allylamino)propyltrimethoxysilane,
4-aminobutyltriethoxysilane,
N-(6-aminohexyl)aminomethyltriethoxysilane,
N,N-bis(2-hydroxyethyl)-3-aminopropyltriethoxysilane,
11-aminoundecyltriethoxysilane,
(N,N-diethylaminomethyl)triethoxysilane,
3-(1,3-dimethylbutylidene)aminopropyltriethoxysilane,
N-phenylaminomethyltriethoxysilane,
(cyclohexylaminomethyl)triethoxy-silane,
tris(triethoxysilylmethyl)amine,
3-(2,4-dinitrophenylamino)propyltriethoxysilane,
3-mercaptopropyltriethoxysilane, The conformal coating composition preferably comprises 3 to 15 weight percent, preferably 5 to 15 weight percent of component (D), based on the total weight of the moisture-curing conformal coating composition.

Component (D) is preferably different from the other components of the conformal coating composition.

Component (E):

The function of component (E) is to bring extra adhesion strength on to various substrates such as, for example, polymer coated printed circuit boards, flexboards, ceramics, silicones, and glass.

Exemplary compounds are, for example, described in U.S. Pat. No. 4,644,074A. In particular, the aminofunctional siloxanes employed in the process of this invention are well known in the art. They may be prepared in accordance with the process described in U.S. Pat. No. 2,947,771 to Bailey, in which an aminofunctional silane is equilibrated with a siloxane in the presence of an alkali-metal hydroxide. Also, they may be prepared in accordance with the process described in U.S. Pat. No. 3,598,853 to Friedman et al., in which an aminofunctional silane is condensed with a silanol terminated polydiorganosiloxane. Other methods for preparing aminofunctional siloxane fluids are described in U.S. Pat. No. 3,890,269 to Martin; U.S. Pat. No. 2,930,809 to Jex et al. and U.S. Pat. No. 3,045,036 to Jex et al. The aminofunctional siloxanes described in these references and their methods of preparation are incorporated herein by reference.

Preferably, the at least one alkoxysilane having one or more primary or secondary amino groups (E) has the following general formula (V):

$$R^6HN—R^7—Si(OR^1)_3 \quad (V),$$

wherein $R^6$ is selected from hydrogen or a hydrocarbon group, preferably hydrogen, and $R^7$ is an alkyl linking group comprising at least one carbon atom, preferably at least 2 carbon atoms, preferably, $CH_2—CH_2—$ or $—CH_2—CH_2—CH_2—$, and $R^1$ is as defined above, preferably methyl or ethyl.

Preferred alkoxysilanes of the general formula (V) are:
beta-aminopropyltriethoxysilane,
gamma-aminopropyltriethoxysilane,
gamma-aminopropyl-dimethoxysilane,
methyl-beta-(aminoethyl)-gamma-aminopropyl dimethoxysilane,
omega-aminohexyltributoxysilane,
beta-(aminoethyl) propyltrimethoxysilane,
beta-(aminoethyl)-hexyltriethoxy-silane,
beta-(aminopropyl)butyltributoxysilane,
(trimethyl-silylpropyl)ethylenediamine,
(trimethylsilylisobutyl)-ethylenediamine, and
gamma-3-Aminopropyltrimethoxysilane.

The conformal coating composition preferably comprises 0.001 to 10 weight percent, preferably 0.5 to 5 weight percent of component (E), based on the total weight of the moisture-curing conformal coating composition.

Component (E) is preferably different from the other components of the conformal coating composition.

Component (F):

The function of component (F) is to make visual and automated optical surface defect inspections easier under UV light.

It is well known in the industry to incorporate pigments and dyes into polymer systems. Dyes/pigments can be predispersed in one or more components of the coating composition or can be added as a separate portion. Dyes/pigments can also be functionalized or covalently bonded to a siloxane, silane other silicone compatible and noncompatible polymers or can be simply physically blended. The carrier polymer can be functional or non-functional.

Preferably, the UV-fluorescent pigments (F) are selected from the group consisting of a UV marker brightening solution that contains one of the proprietary brightening agents which are fluorescent under UV or black light. Materials dissolvable or dispersible into polydimethylsiloxane (PDMS) polymers and networks are preferably utilized.

In a preferred embodiment, ELASTOSIL® Colour Paste FL UV Fluorescent dye from WACKER Chemie AG can be incorporated into the coating compositions of the present invention in order to provide for autofluorescence that is critical for automated inspection of finished PCBs (printed circuit boards). In addition, solubilizing or grafting other fluorescent markers such as TINOPAL OB (BASF), KB-140 and KB-6002 (KUSTOM GROUP), fluoranthene, coumarin 120, pyrene derivatives, and perylene are also possible.

Dyes/pigments can be covalently bonded to a siloxane, silane other polymers or can be physically blended. Optional carrier polymers can be functional or not functional PDMS or any other silicone compatible polymers, copolymers or oligomers.

Preferably component (F) comprises 1 to 10 parts TINOPAL OB or UVITEX optical brighteners are designed for use in various applications. Such dyes are incorporated in to a 100-parts functional or non-functional silicone.

The resultant fluid can be further diluted or used as is in the conformal coating formulation of the present invention to aid automated defect detection under UV or black light. Combinations of different pigments, dyes, optical brighteners and fluorescent markers are also possible.

The conformal coating composition preferably comprises 0.001 to 10 weight percent, more preferably 0.5 to 5 weight percent of component (F) based on the total weight of the moisture-curing conformal coating composition.

Component (F) is preferably different from the other components of the conformal coating composition.

Component (G):

The function of component (G) is to further adjust physical and mechanical properties such as tailoring hardness and softness, increasing abrasion resistance, promoting adhesion and anchorage additional components can be incorporated. This component can be reactive and covalently bonded to the moisture cure matrix (as in case of, for example, phenyltriethoxysilane) or could be blended and stay unbound in the polymer matrix (as in case of, for example, non-reactive polydimethylsiloxane (PDMS) fluids).

A preferred functional compound is phenyltriethoxysilane, commercially available as SILANE P-TRIETHOXY from WACKER Chemie AG or as PHENYLTRIETHOXYSILANE from GELEST, Inc.

A preferred non-functional compound polydimethylsiloxane, commercially available as WACKER® AK fluids such as WACKER® AK 50 which is a linear, non-reactive polydimethylsiloxane with a viscosity of approx. 50 mPa·s, measured based on a standard test method ASTM D4652 conducted at room temperature (25° C.) utilizing a Brookfield DV-1 digital viscometer instrument equipped with a LV-2(62)type spindle at a speed of 50 rpm.

Preferably, the moisture-curing conformal coating composition further comprises (G) one or more additives selected from the group consisting of viscosity modifiers or mechanical property and adhesion enhancers.

Preferred additives are:
trimethylsilyl-terminated unfunctional PDMS fluids or other widely known reactive diluents, resins, or silanes.

Preferred functional additives are; ethyltrimethoxysilane, methylbutoxydiethoxysilane, propyltripropoxysilane, methyltriethoxysilane, ethyltriethoxysilane, ethyl orthosilicate, and n-butyl orthosilicate or ethylpolysilicate, isopropylpolysilicate, butylpolysilicate, dimethyltetraethoxydisiloxane, trimethylpentabutoxytrisiloxane, phenyltriethoxysilane, phenyltributoxysilane, diphenyldiethoxysilane, propyltrimethoxysilane, hexyltrimethoxysilane, octyltrimethoxysilane, propyltributoxysilane and methyltriethoxysilane and partially hydrolyzed silicates, such as ethyl silicate.

In addition following functional additives can be used in combination with above silanes for performance enhancement: alpha-aminomethylsilanes such as aminomethyl-triethoxy-silane, aminomethylmethyldiethoxysilane, N-cyclohexyl-aminomethyl-triethoxysilane, N-cyclohexylaminomethyl-methyldiethoxysilane, N-ethylaminomethyl-triethoxy-silane, N-ethylaminomethyl-methyldiethoxysilane, N-butylaminomethyl-triethoxysilane, N-butylaminomethyl-methyldiethoxysilane, N-phenylaminomethyl-triethoxy-silane, N-phenylaminomethyl-methyldiethoxysilane, O-methylcarbamatomethyl-triethoxysilane, O-methyl-carbamatomethyl-methyldiethoxysilane, N-phenyltriethoxysilane, N,N-diethylamino-methyl-triethoxysilane, N,N-diethylaminomethyl-methyl-diethoxysilane, N,N-dibutylaminomethyl-triethoxysilane, N,N-dibutylaminomethyl-methyldiethoxysilane, N-(triethoxysilylmethyl)piperazine, N-(methyldiethoxysilyl-methyl)piperazine, N-(triethoxysilylmethyl)morpholine, N-(methyldiethoxysilylmethyl)morpholine etc. Additionally, alpha-oxymethylsilanes such as methacryloyloxymethyl-triethoxysilane, methacryloyloxymethyl-methyldiethoxysilane, methoxy-methyl-triethoxysilane, methoxymethyl-methyldiethoxy-silane, glycidyloxymethyl-triethoxysilanes, and glycidyloxymethyl-methyldiethoxysilane. additionally. alpha.-phosphonato-methylsilanes such as diethylphosphonic ester-methyl-triethoxysilane, diethylphosphonic ester-methyl-methyldiethoxysilane. As well as the silanes listed here with ethoxysilyl groups, the corresponding methoxysilanes are likewise can be utilized.

Component (G) is preferably different from the other components of the conformal coating composition.

The conformal coating composition preferably comprises 0 to 25 weight percent, more preferably 1 to 10 weight percent, even more preferably 5 to 7 weight percent of component (G), based on the total weight of the moisture-curing conformal coating composition.

The moisture-curing conformal coating composition according to the present invention preferably comprises, more preferably consists of, based on the total weight of the moisture-curing conformal coating composition:
- 40 to 70 weight percent, preferably 50 to 60 weight percent of component (A),
- 10 to 30 weight percent, preferably 15 to 25 weight percent of component (B),
- 3 to 20 weight percent, preferably 5 to 15 weight percent of component (C),
- 3 to 15 weight percent, preferably 5 to 15 weight percent of component (D),
- up to 10 weight percent, preferably 0.5 to 5 weight percent of component (E),
- up to 10 weight percent, preferably 0.5 to 5 weight percent of component (F), and optionally,
- 0 to 25 weight percent, preferably 1 to 10 weight percent of component (G).

Preferably, the moisture-curing conformal coating composition is sprayable.

Preferably, the viscosity of the conformal coating composition is in the range of 50 to 10,000 mPa·s more preferably in the range of 100 to 6,000 mPa·s, particularly in the rage of 500 to 4,000 mPa·s. The viscosity can be measured by a Brookfield viscometer equipment based on a standard test method ASTM D4652 at 25° C., utilizing an LV-2(62) type spindle at a speed of 50 rpm.

The conformal coating composition of the present inventions should preferably meet the necessary flow properties without additional diluents and/or viscosity modifiers (agents), such as, f. ex. softening agents.

Accordingly, the conformal coating composition of the present invention does not comprise diluents and/or viscosity modifiers.

The conformal coating composition of the present invention is preferably an RTV-1 composition, i.e. it is a one-part composition which cures at room temperature (ca. 25° C.).

Preferably, the compositions of the present invention have low volatile organic content to avoid misting to accommodate high pressure spraying processes. Low volatile organic content products are furthermore desirable and demanded in coating industries due to environmental and health safety regulations.

The percent volatiles can be determined gravimetrically by international standard test method ASTM D-2369. More precisely volatile organic content is also determined by a gas chromatography method using international standard test method ASTM D-2369.

Furthermore, the present invention relates to a process for preparing the composition of any of claims 1 to 10 comprising mixing components (A), (B), (C), (D), (E), (F) and, optionally, component (G).

Preferably, the process according to the present invention comprises the following steps
(a) first mixing components (A), (B) and (D);
(b) homogenizing the composition of step (a);

(c) admixing components (C), (E), (F) and, optionally (G), to the composition of step (b).

Preferably, step (b) comprises heating of the composition.

Mixing and homogenizing can be carried out by any known method, preferably by a planetary mixing equipment such as, for example, PC Laborsystem model LA G2.

EXAMPLES

Inventive Example 1

The following compounds have been used to prepare a moisture-curing conformal coating composition:
A: OH-functional silicone fluid (WACKER® CT 601M, WACKER Chemie AG),
B: Silicone resin comprising Q units and M units (WACKER® MQ 803 TF, Wacker Chemie AG),
C: Partially hydrolyzed ethyl silicate polymer (WACKER® SILICATE TES 40 WN, Wacker Chemie AG),
D: N,N,-di(butyl)aminomethyltriethoxy silane (SILAN DBA-TEO, Wacker Chemie AG),
E: 3-Aminopropyltrimethoxysilane (GENIOSIL® GF 96, Wacker Chemie AG),
F: Fluorescent pigment paste (ELASTOSIL® UV FL, Wacker Chemie AG),
G1: Phenyl triethoxysilane (SILANE P-TRIETHOXY, Wacker Chemie AG),
G2: Linear, non-reactive polydimethylsiloxane (WACKER® AK 50, Wacker Chemie AG)

The following weight ratios were used:

| Component | Wt.-% |
| --- | --- |
| A | 54.1 |
| B | 23.2 |
| C | 7.5 |
| D | 7.4 |
| E | 1 |
| F | 1 |
| G1 | 1.8 |
| G2 | 4 |
| Total | 100 |

Component D was added first in order to have access at all times during mixing. Nitrogen flow was started to establish a nitrogen blanket (moisture-free mixing environment). Component A was added followed by slowly adding powdered component B while mixing. Mixing is continued until the composition is evenly dispersed (appearance: cloudy dispersion—solid resin particles dispersed in fluids). Alternatively, components A and B can be premixed separately, and this pre-mixture is added on to component D. The mixture is optionally heated to 45° C. (time for mixture to homogenize is ca. 1 h at 45° C. or ca. 2 h at room temperature, for small scale lab samples that are prepared in speed mixer, 10 min at 70° C. is enough to fully dissolve component A and B).

Remaining components were then added while stirring under a nitrogen blanket in the following order: component G2, component C, component G1, component E, component F (alternatively, a speed mixer can be utilized for small lab scale sample preparation). The mixing was continued until a homogeneous (translucent) formulation was obtained. Vacuum (0-200 mbar preferably 0 to 100 mbar or more preferably 0-50 mbar) can be applied (vacuum application can begin at any point after adding all ingredients). Mixing was continued for a minimum of 30 min under vacuum followed by breaking the vacuum with a nitrogen blanket. The resulting product was moisture sensitive. Therefore, vacuum and/or nitrogen blanket is necessary for long time storage and bigger scale samples.

The properties of the inventive conformal coating composition were compared to commercially available compositions:

Comparative Example 1: SEMICOSIL® 964 (WACKER Chemie AG), an RTV-1 Amine Cure System that Cures on Contact with Moisture in the Air to a Translucent Coating Comparative Example 2: Dow Corning® 3-1965 Conformal Coating (Dow Corning)

Comparative Example 3: ECC3050S Conformal Coating (Momentive)

The results are summarized as follows:

| | Inv. Ex. 1 | Comp. Ex. 1 | Comp. Ex. 2 | Comp. Ex. 3 |
| --- | --- | --- | --- | --- |
| Hardness (ShA) | 42 | 35 | 41 | 20 |
| Anchorage/ Adhesion | Excellent | Poor | Good | Good |
| Volatiles | Low | High | Low | Low |
| Tensile Strength | 85 psi (0.586 MPa) | 52 psi (0.359 MPa) | 97 psi (0.669 MPa) | 26 psi (0.179 MPa) |
| Elongation | 40% | 28% | 45% | 25% |
| Tack free time | ~11 min | ~25 min | ~6 min | ~9 min |
| Viscosity | ~800 mPa·s | ~400 mPa·s | ~145 mPa·s | ~540 mPa·s |

The following test methods have been applied:
Hardness: test method standard ASTM D2240,
Adhesion and anchorage: test method standard ASTM D3359, Volatiles: test method standard ASTM D-2369,
Tensile strength: test method standard ASTM D638,
Elongation: test method standard ASTM D412.

The inventive conformal coating is odor free, and has improved mechanical properties to adsorb physical stress, and respond to thermal cycles (low and high temperature fluctuations).

The invention claimed is:

1. A moisture-curing conformal coating composition, comprising:
   a Component (A) of one or more linear hydroxyl terminated organopolysiloxanes;
   a Component (B) of one or more organopolysiloxane resins;
   a Component (C) of one or more organosilicates;
   a Component (D) of one or more alkoxysilanes having at least one tertiary amino group;
   a Component (E) of one or more alkoxysilanes having at least one primary or secondary amino group; and
   a Component (F) of one or more UV-fluorescent pigments or dyes;
   wherein the one or more alkoxysilanes having at least one tertiary amino groups (D) have the following general formula (IV):

$$R^3R^4N-(CR^5{}_2)-Si(R^2)_{3-x}(OR^1)_x \quad (IV),$$

wherein x is 2 or 3;

wherein R¹ and R² are each independently selected from hydrocarbon radicals having 1-12 carbon atoms, or alkoxy-alkyl radicals having C2-C10 carbon atoms;

wherein R³ and R⁴ are each independently selected from an alkyl, cycloalkyl, alkenyl or aryl radical, each having up to 12 carbon atoms and each being optionally substituted; and wherein R⁵ is hydrogen or an alkyl, cycloalkyl, alkenyl or aryl radical, each having up to 12 carbon atoms and being optionally substituted.

2. The composition of claim 1, wherein the one or more linear hydroxyl terminated organopolysiloxanes (A) has the following general formula (I):

$$HO \left[ \begin{matrix} R^0 \\ | \\ Si \\ | \\ R^0 \end{matrix} O \right]_n H \qquad (I)$$

wherein each R⁰ is independently selected from C1 to C10 alkyl; and wherein n is a number from 5 to 5,000.

3. The composition of claim 1, wherein the one or more organopolysiloxane resins (B) comprises the following units:

$$R_3SiO_{1/2} \qquad (IIa)$$

$$SiO_{4/2} \qquad (IIb)$$

wherein each R is independently selected from an alkyl group, alkoxy group, hydroxy group, or alkenyl group.

4. The composition of claim 1, wherein the one or more organosilicates (C) have the following general formula (III):

$$R^1O \left[ \begin{matrix} OR^1 \\ | \\ Si \\ | \\ OR^1 \end{matrix} O \right]_n R^1, \qquad (III)$$

wherein each R¹ is independently selected from C1 to C10 alkyl, or C2 to C20 alkoxy-alkyl; and wherein n is a number from 1 to 10.

5. The composition of claim 1, wherein the one or more alkoxysilanes having at least one primary or secondary amino group (E) have the following general formula (V):

$$R^6HN—R^7—Si(OR^1)_3 \qquad (V);$$

wherein R⁶ is selected from hydrogen or a hydrocarbon group;

wherein R⁷ is an alkyl linking group comprising at least two carbon atoms; and wherein R¹ is independently selected from C1 to C10 alkyl, or C2 to C20 alkoxy-alkyl.

6. The composition of claim 1, wherein the composition further comprises (G) one or more additives selected from the group consisting of viscosity modifiers or mechanical property and adhesion enhancers.

7. The composition of claim 1, wherein, based on the total weight of the moisture-curing conformal coating composition, the composition comprises 40 to 70 weight percent, preferably 50 to 60 weight percent of the Component (A), 10 to 30 weight percent, preferably 15 to 25 weight percent of the Component (B), 3 to 20 weight percent, preferably 5 to 15 weight percent of the Component (C), 3 to 15 weight percent, preferably 5 to 15 weight percent of the Component (D), 0.001 to 10 weight percent, preferably 0.5 to 5 weight percent of the Component (E), 0.001 to 10 weight percent, preferably 0.5 to 5 weight percent of the Component (F), and optionally, 0 to 25 weight percent, preferably 1 to 10 weight percent of the Component (G).

8. The composition of claim 1, wherein the moisture-curing conformal coating composition is sprayable.

9. The composition of claim 1, wherein the viscosity of the conformal coating composition is in the range of 50 to 10,000 mPa·s, preferably in the range of 100 mPa·s to 6,000 mPa·s, more preferably in the rage of 500 mPa·s to 4,000 mPa·s, measured at 25° C.

10. A process for preparing a moisture-curing conformal coating composition, comprising:

providing
- a Component (A) of one or more linear hydroxyl terminated organopolysiloxanes,
- a Component (B) of one or more organopolysiloxane resins,
- a Component (C) of one or more organosilicates,
- a Component (D) of one or more alkoxysilanes having at least one tertiary amino group,
- a Component (E) of one or more alkoxysilanes having at least one primary or secondary amino group,
- a Component (F) of one or more UV-fluorescent pigments or dyes, and
- optionally a Component (G) of one or more additives selected from the group consisting of viscosity modifiers or mechanical property and adhesion enhancers, wherein the one or more alkoxysilanes having at least one tertiary amino groups (D) have the following general formula (IV):

$$R^3R^4N—(CR^5{}_2)—Si(R^2)_{3-x}(OR^1)_x \qquad (IV),$$

wherein x is 2 or 3, wherein R¹ and R² are each independently selected from hydrocarbon radicals having 1-12 carbon atoms, or alkoxy-alkyl radicals having C2-C10 carbon atoms, wherein R³ and R⁴ are each independently selected from an alkyl, cycloalkyl, alkenyl or aryl radical, each having up to 12 carbon atoms and each being optionally substituted, and wherein R⁵ is hydrogen or an alkyl, cycloalkyl, alkenyl or aryl radical, each having up to 12 carbon atoms and being optionally substituted; and mixing the Components (A), (B), (C), (D), (E), (F) and, optionally, Component (G) together.

11. The process of claim 10, further comprising, (a) first mixing the Components (A), (B) and (D) together;

(b) homogenizing the composition of step (a);

(c) admixing the Components (C), (E), (F) and, optionally (G), to the composition obtained from step (b).

12. The process of claim 11, wherein step (b) further comprises the step of heating the composition.

* * * * *